INVENTOR.
HARRY A. SAVAGE
BY Salvatore G. Militano
attorney

INVENTOR.
HARRY A. SAVAGE
BY Salvatore G. Militano
attorney

Nov. 1, 1966  H. A. SAVAGE  3,282,513
SELF-CLEANING INJECTION NOZZLE
Filed Jan. 7, 1965  3 Sheets-Sheet 3

INVENTOR.
HARRY A. SAVAGE
BY
Salvatore G. Militana,
attorney

United States Patent Office 3,282,513
Patented Nov. 1, 1966

3,282,513
SELF-CLEANING INJECTION NOZZLE
Harry A. Savage, Miami, Fla., assignor of fifty percent to
Donald W. Barlow, Miami, Fla.
Filed Jan. 7, 1965, Ser. No. 424,055
3 Claims. (Cl. 239—534)

This invention relates to injection nozzles and is particularly directed to a self-cleaning injection nozzle.

In the injection of chemicals into a large body of liquid such as in the treatment of water there is the formation of precipitates at the injection point wherein the precipitates occlude thereon to prevent the proper operation of the nozzle. Diverse methods and apparatuses have been devised and utilized to either avoid the formation of these precipitates or to prevent the precipitates from adhering to the nozzle. In either instance, to date there has not emerged a commercial device that successfully avoids the usual incrustations of an injection point so that periodically the conventional injection nozzle fails to operate properly and must be overhauled or replaced. The present invention contemplates the prevention of the accumulation of precipitates at the injection point by removal of the percipitates immediately as they are formed thereon.

Therefore a principal object of the present invention is to provide an injection nozzle for the injection of a chemical in a body of liquid in which the injection nozzle is provided with an expandable body portion that prevents the occlusion of precipitates thereon at each operation of the nozzle.

Another object of the present invention is to provide a self-cleaning injection nozzle with a resilient sleeve portion that vibrates and flutters as the chemical is being discharged therethrough to dislodge and remove any percipitates formed on the nozzle.

A further object of the present invention is to provide a self-cleaning injection nozzle for the treatment of water that prevents any possibility of back feeding of water into the nozzle at the completion of each injection of chemicals into the water being treated.

A still further object of the present invention is to provide an injection nozzle in the treatment of water for hardness with a resiliently plastic sleeve for controlling the flow of chemicals into the water wherein the sleeve will expand with an undulating and fluttering motion as the chemical is discharged therethrough and returns to its closed position thereby breaking off the incrustations of precipitates formed thereon to permit the continuous proper operation of the injection nozzle without back-feeding any of the water past the plastic sleeve.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

Figure 1:
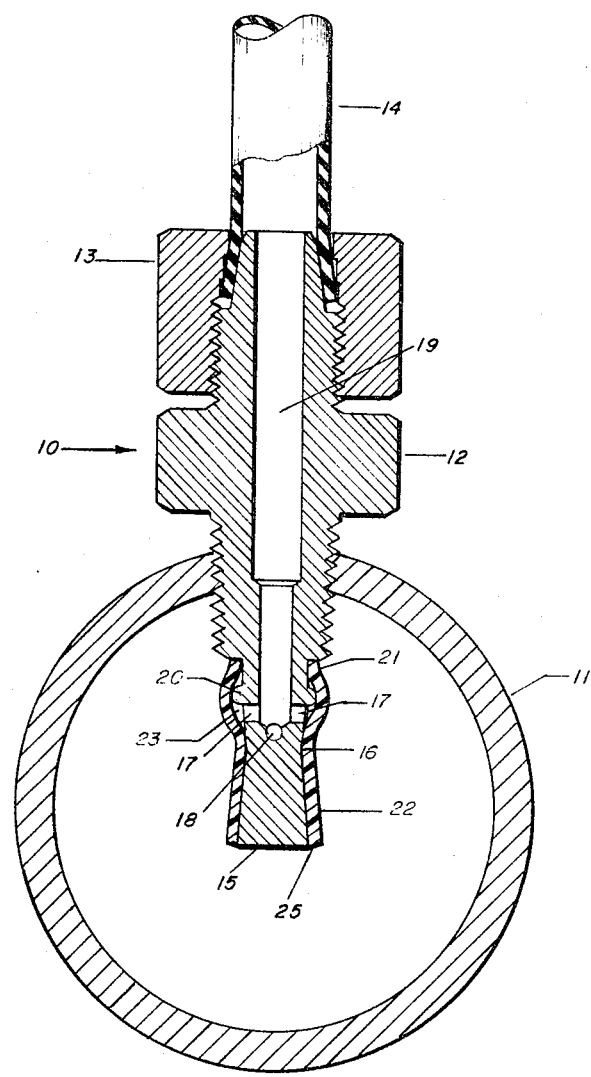
FIGURE 1 is a fragmentary cross sectional view of my injection point nozzle shown positioned in a pipe through which flows a liquid being treated.

Referring to the drawings wherein like numerals are used to designate similar parts throughout the several views, the numeral 10 refers to my self-cleaning injection nozzle shown threadedly mounted in a pipe 11, the point of injection, through which the liquid flows that is to be treated. The nozzle 10 is provided with a body member 12 on which a coupler 13 is threadedly mounted for securing a tubing 14 that extends to a source (not shown) of a chemical.

The discharge end portion 15 of the nozzle 10 is conical in shape increasing in diameter in both directions from a midportion 16 above which position are a plurality of radially disposed discharge ports 17 and 18 that communicate with a centrally disposed fluid passageway 19.

Adjacent to the discharge ports 17 is a peripheral ridge portion 20 having a slotted portion 21 adjacent thereto. A resilient sleeve valve 22 formed from a section of a plastic cylindrical tubing having the desired qualities of resiliency is fitted over the nozzle tip 15 as best shown by FIGURE 1. It is to be noted that a chamber 23 is formed between the nozzle 15 and the sleeve valve 22 and that since the radius of curvature of the nozzle tip 15 at the discharge end thereof is smaller than that of the ridge portion 20 as measured from the axis of the nozzle itself, a greater force is exerted by the sleeve valve 22 at the ridge portion 20 than at the extreme end of discharge tip 15. Consequently, fluid under pressure that enters the chamber 23 will be discharged at the discharge end of the nozzle tip 15 before the fluid can escape past the ridge portion 20 in the direction of the slotted portion 21.

Figure 3:
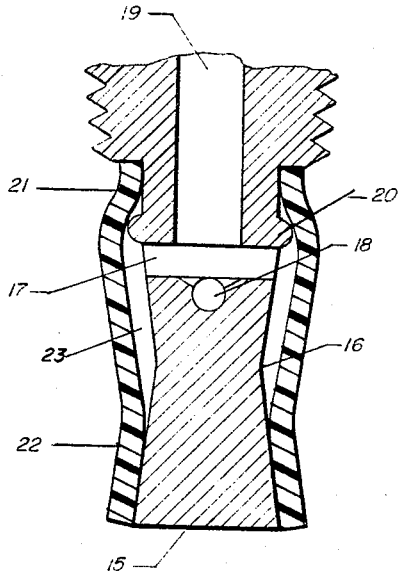
FIGURE 3 is a similar view showing the next stage of the cycle of operation with chemical being pumped to the nozzle.
Figure 5:
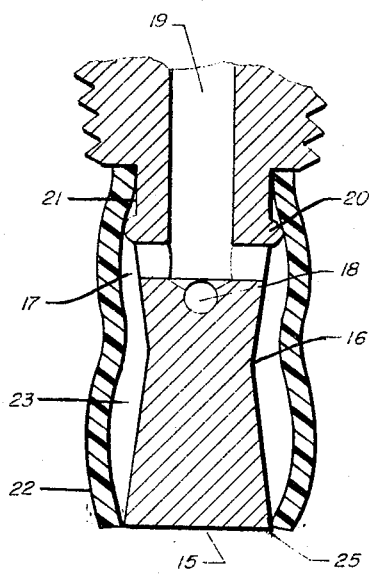
FIGURE 5 is a similar view showing the nozzle during the discharge of chemical therefrom.

In the normal use of my self-cleaning injection nozzle 10 connected as shown by FIGURE 1 to treat water, for instance, that is flowing through the pipe 11, a chemical being pumped through the tubing 14 will flow through the passageway 19, through the discharge orifices 17 and 18 and into the chamber 23. The chamber 23 becomes filled with the chemical under pressure and begins to cause the sleeve valve 22 to distend as shown by FIGURE 3 enlarging the chamber 23 by the increasing volume of chemical being discharged through orifices 17 and 18 until the sleeve valve 22 assumes the position shown by FIGURE 5. At this cycle of operation, the sleeve valve 22 has distended to the position wherein chemical under pressure is being discharged about the periphery of the discharge end of the nozzle tip 15 as at 25 with the free end of the sleeve valve 22 vibrating or fluttering.

This fluttering action of the sleeve valve 22 continues until the source of chemical under pressure is cut off as in a reciprocating pumping action or when no more chemical is desired to be discharged into the water in the pipe 11. At the moment pressure of the chemical in the chamber 23 is cut off or reduced sufficiently, the sleeve valve 22 will commence to attenuate or contract.

Figure 2:
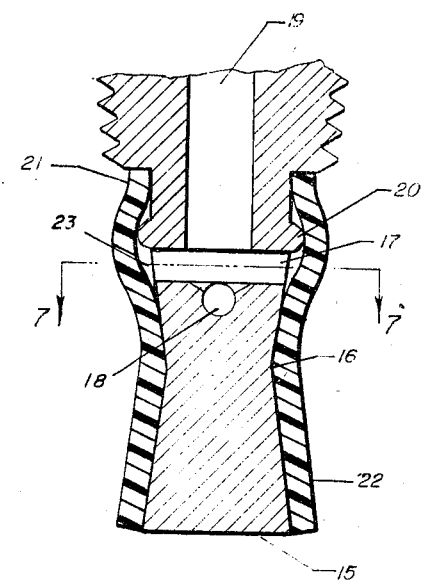
FIGURE 2 is an enlarged cross sectional view of the nozzle showing the first stage of the cycle of operation when the nozzle is in its closed position.
Figure 4:
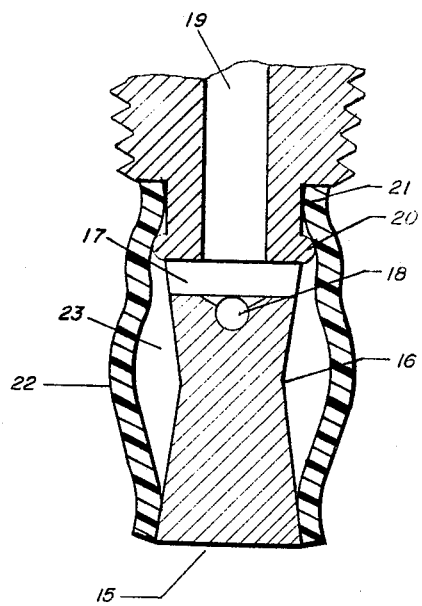
FIGURE 4 is a similar view showing the nozzle when the chemical being pumped to the nozzle is at the position to be discharged.
Figure 7:
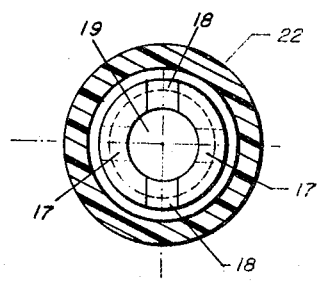
FIGURE 7 is a cross sectional view taken along the line 7—7 of FIGURE 2.
Figure 6:
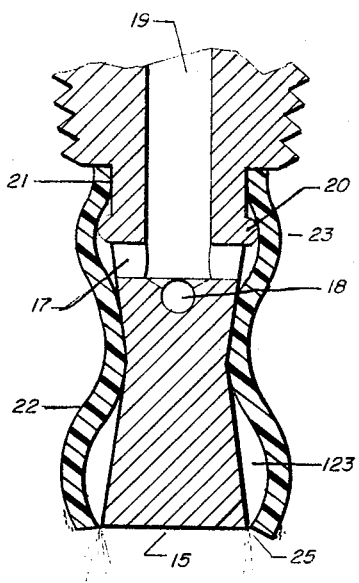
FIGURE 6 is a similar view showing the nozzle during discharge of the chemical immediately prior to the nozzle coming to its closed position.

Immediately upon the pressure within the chamber 23 dropping sufficiently to permit the sleeve valve 22 to retract to its original position, the sleeve 22 will contact and engage the nozzle tip 15 at the mid position portion 16 as shown by FIGURE 6, with some of the chemical contained in the chamber 23 and the remainder in chamber 123. The chemical in the chamber 23 is now not under pressure while the chemical in the chamber 123 is discharged at 25 by the pressure being exerted by the resilient sleeve valve 22. This resilient force virtually squeezes the chemical out of the chamber 123 until all of the chemical contained therein has been discharged. With all of the chemical discharged from the chamber 123, the sleeve valve 22 will now engage the nozzle tip 15 along its full length except for that portion forming the chamber 23 as shown best by FIGURE 2.

Inasmuch as the area of the vicinity of the injection nozzle tip 15 will be highly concentrated with the chemical used for removing the hardness materials from the water flowing through the pipe 11, there will be considerable precipitation of the hardness materials which will attach themselves to whatever apparatus that is present in this area. Consequently in periods of non-operation of the injection nozzle, these precipitates will settle on the outer surface of the sleeve valve 22 but will not be able to occlude thereon because of the undulating motion of the sleeve valve 22 as explained hereinabove as the nozzle 10 operated to discharge the chemical in the water flowing in the pipe 11. The undulating motion of the sleeve valve 22 as the system alternatingly discharged and stopped discharging the chemical will readily crack, peel and slough off any precipitates that may have become attached to the outer surface of the sleeve valve 22. At the same time during the actual discharging operation of the injection nozzle 10, the free end of the sleeve valve 22 will be vibrating or fluttering to prevent the formation and accumulation of precipitates at the discharge position 25, which portion is the most vulnerable part of the injection nozzle 15. If any precipitate were permitted to accumulate at the extreme tip of the nozzle 15, then the sleeve valve 22 would not seat properly on the nozzle tip 15 and water would backfeed into the chemical system. Also, if any precipitate forms at the tip of the sleeve valve 22 and the nozzle tip 15, during the non-operating phase of the injection nozzle 10, when chemical under pressure reaches the chamber 23 the previously described undulating motion of the sleeve valve 22 will be effected to cause the precipitate at the tip of the nozzle 15 to break off and be washed away as the chemical is discharged by the nozzle 10.

Figure 8:
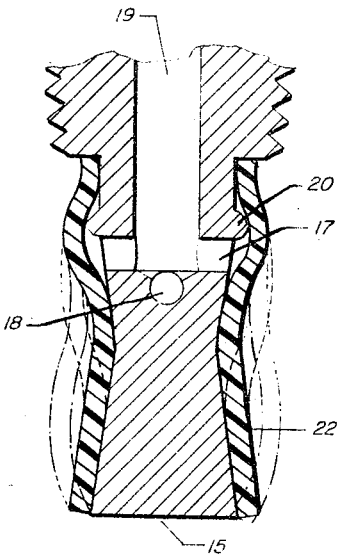
FIGURES 8 and 9 are views illustrating the undulating movement of the sleeve valve in a complete cycle of operation.

The undulating motion effected by the sleeve valve 22 at the time the chemical is discharged through the orifices 17, 18 and finally discharged by the nozzle at the tip 25 is shown by FIGURE 8. The solid line is the position shown by FIGURE 3 and the center lines by the position shown by FIGURE 5 with the extreme tip of the sleeve 22 fluttering at all times during the discharge of the chemical into the water in a cone shape.

Figure 9:
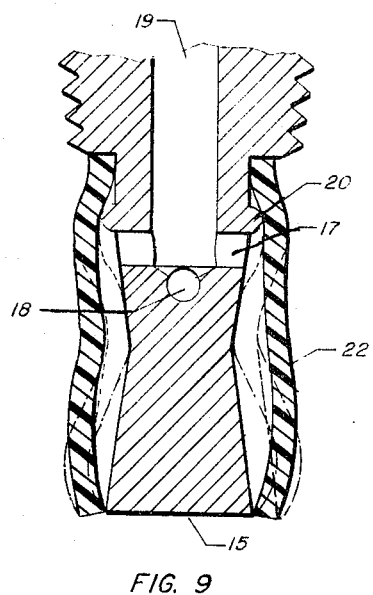

As shown by FIGURE 9, this undulating motion of the sleeve valve 22 continues when the chemical flow is cut off. The solid line shows the position of the sleeve valve 22 when the sleeve valve 22 begins to contract or return to its original position as indicated by FIGURE 6. As the chemical in the chamber 123 continues to be discharged at the nozzle tip 15, the sleeve valve 22 engages the side walls of the nozzle tip 15 until all of the chemical has been discharged. This prevents any water from back feeding into the chambers 123 or 23 as the sleeve valve 22 comes to its completely closed position.

Having disclosed my invention, what I claim as new and desire to secure by Letters Patent of the United States is:

1. A self-cleaning injection nozzle comprising a substantially arcuate body member of varying cross sectional areas having a base portion and a discharge portion, said body member having a portion of minimal cross sectional area intermediate said base portion and said discharge portion, said discharge portion being of uniform increasing cross sectional area from said minimal cross sectional area to said discharge portion, a peripheral ridge extending about said body member at said base portion, said body member having a discharge port at said peripheral ridge, a substantially resilient sleeve mounted over and engaging substantially the entire surface of said body member extending from said base portion to said discharge portion, said peripheral ridge forming a chamber about said body member at said discharge port, said body member having a fluid passageway communicating with said discharge port for the flow of fluid under pressure to said resilient sleeve adjacent said peripheral ridge whereby upon the flow of fluid under pressure said resilient sleeve will expand in an undulating movement.

2. A self-cleaning injection nozzle comprising a substantially conical body member of increasing cross sectional area, said body member having an end portion of minimal cross sectional area and a discharge portion of maximum cross sectional area, a base member joining said body member at said end portion, a peripheral ridge extending about said body member at said base member, said body member having a discharge port adjacent said peripheral ridge, a substantially resilient sleeve mounted and engaging substantially the entire surface of said body member and base member except for a chamber formed at said peripheral ridge over said body member and said base member, said base member having a fluid passageway communicating with said discharge port for the flow of fluid under pressure to said chamber beneath said resilient sleeve in proximity of said base member of said body member and said ridge member preventing the flow of fluid to said base member whereby said fluid under pressure will expand said sleeve in an undulating movement and be discharged at said discharge portion of said nozzle.

3. A self-cleaning injection nozzle comprising a substantially conical body member of increasing cross sectional area, said body member having an end portion of minimal cross sectional area and a discharge portion of maximum cross sectional area, a substantially conical base member of increasing cross sectional area joining said end portion at its minimal cross sectional area, a peripheral ridge extending about said base member at its maximum cross sectional portion, said cross sectional area at said peripheral ridge being greater than that at said discharge portion of said body member, a substantially resilient body member extending over said body member, said base member and said peripheral ridge, said base member having a fluid passageway for the flow of fluid under pressure to said resilient sleeve in proximity of said peripheral ridge whereby said fluid under pressure will expand said sleeve in an undulating movement and be discharged at said discharge portion in a hollow cone shaped spray.

References Cited by the Examiner

UNITED STATES PATENTS

| | | | |
|---|---|---|---|
| 384,306 | 6/1888 | Bourdil | 239—534 |
| 2,533,191 | 12/1950 | Jaeger | 239—534 |
| 2,534,445 | 12/1950 | Hilkemeier | 239—534 |
| 2,534,874 | 12/1950 | Mettler | 239—534 |
| 2,890,838 | 6/1959 | Jannsen | 239—534 |

EVERETT W. KIRBY, *Primary Examiner.*